H. D. AYLSWORTH.
FILM MAGAZINE FOR MOTION PICTURE CAMERAS.
APPLICATION FILED FEB. 24, 1919.
1,332,374.
Patented Mar. 2, 1920.
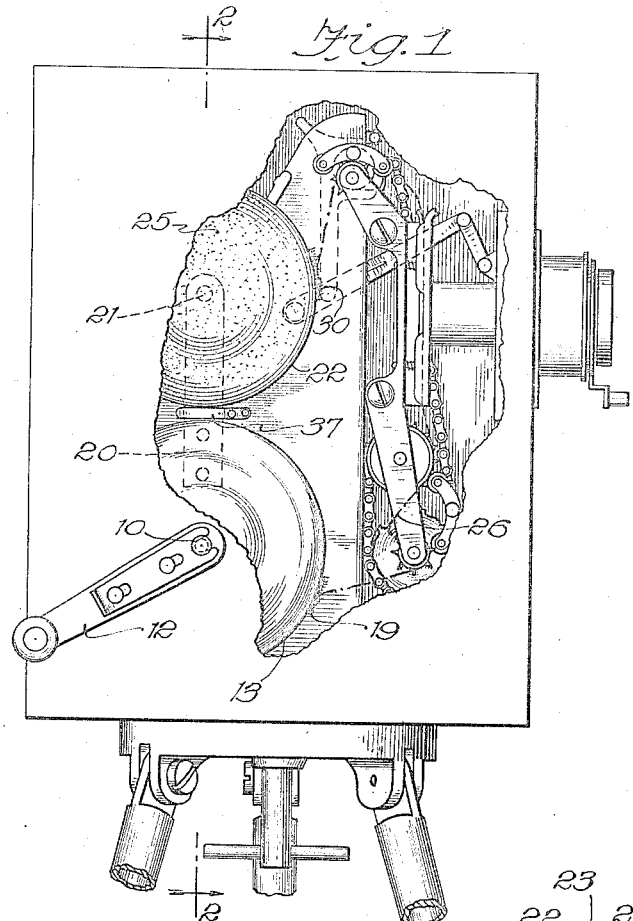
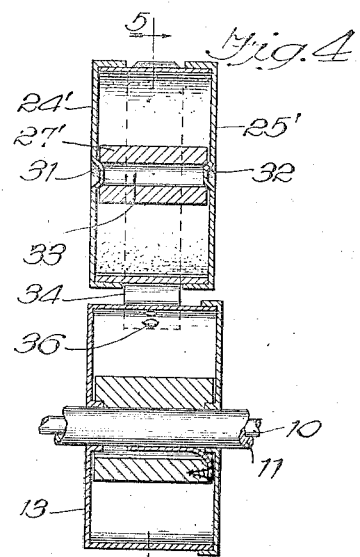
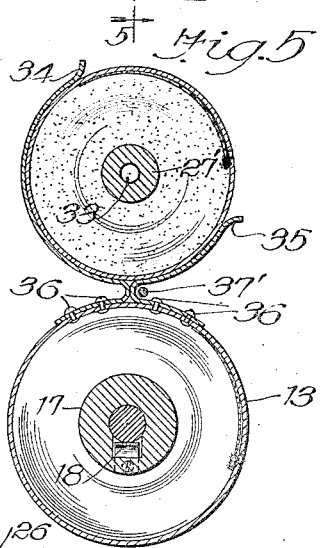
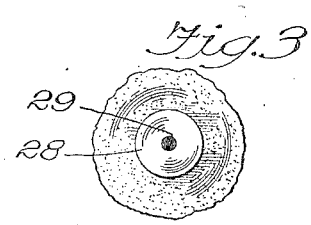
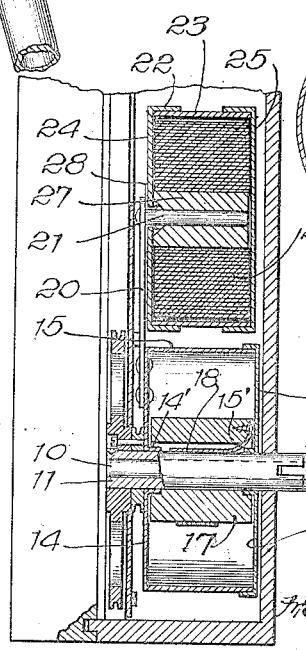
Inventor
Harold D. Aylsworth
Williams, Bradbury & Lee
Attys.

UNITED STATES PATENT OFFICE.

HAROLD D. AYLSWORTH, OF CHICAGO, ILLINOIS, ASSIGNOR TO KLIX MANUFACTURING COMPANY, OF CHICAGO, ILLINOIS, A CORPORATION OF ILLINOIS.

FILM-MAGAZINE FOR MOTION-PICTURE CAMERAS.

1,332,374. Specification of Letters Patent. Patented Mar. 2, 1920.

Application filed February 24, 1919. Serial No. 278,865.

*To all whom it may concern:*

Be it known that I, HAROLD D. AYLSWORTH, a citizen of the United States, residing at Chicago, in the county of Cook and State of Illinois, have invented a certain new and useful Improvement in Film-Magazines for Motion-Picture Cameras, of which the following is a full, clear, concise, and exact description, reference being had to the accompanying drawings, forming a part of this specification.

My invention relates to improvements in film magazines for motion picture cameras, and is especially concerned with a magazine for unexposed film.

The objects of my invention are:

First: To provide a magazine for holding unexposed motion picture film, which can be constructed so economically that it may be thrown away when the film therein has been withdrawn therefrom;

Second: To provide a magazine for motion picture film of such construction that it can be quickly and easily placed in and withdrawn from a motion picture camera;

Third: To provide a motion picture camera including novel means for holding my improved film magazine; and Fourth: To provide a novel article of manufacture comprising a motion picture film inclosed in my novel magazine.

Further objects will appear as this description progresses, reference being had to the accompanying drawings, in which:

Figure 1 is a side elevation of a motion picture camera, disclosing portions of the mechanism thereof, and parts of the supply and take-up magazines in side elevation, a portion of the camera box being broken away for this purpose;

Fig. 2 is a fragmentary section taken on line 2—2 of Fig. 1;

Fig. 3 is a side elevation of a portion of my film magazine;

Fig. 4 is a section corresponding to the section shown in Fig. 2, but showing a modified form of my film magazine, and the means for supporting the same in position in the camera; and Fig. 5 is a section taken on line 5—5 of Fig. 4.

Heretofore, so far as I am aware, the magazines for holding film for motion picture cameras have always been constructed of metal or wood or other similar material and constructed in such a manner as to make the cost of these magazines so great that they cannot be discarded after having been emptied of their film, but must be reloaded and used over and over. This means that a dark room or some equivalent means must be provided to permit of the reloading operation, and it has been customary heretofore to charge the purchaser of the film for the supply magazine and to then allow him to return this magazine to be refilled. This arrangement involves a considerable amount of trouble and expense, and is for that reason objectionable.

I propose to overcome this difficulty by providing a film magazine for holding the unexposed film, which is so cheap to manufacture that it may be thrown away or discarded after the film has been withdrawn therefrom.

Referring to the drawings in this application, in Fig. 1 I have illustrated a motion picture camera in side elevation, which is similar in construction to that illustrated and described in the accompanying application filed February 8, 1919, jointly in my name and that of Melbert King, Serial No. 275,692. Portions of the box of this camera are broken away to disclose parts of the film-advancing means and the shutter mechanism. Since the details of this mechanism form no part of my present invention, I will not refer to them further except as it becomes necessary for the proper understanding of my present invention.

The reference character 10 indicates a stud shaft upon which is mounted a sleeve 11, forming the driving shaft of the camera, which can be rotated by means of a crank 12.

Reference character 13 indicates the take-up film magazine having an end closure 14 formed integrally with the side wall 15, and a removable end closure 16. The end closures 14 and 16 are perforated and flanged inwardly at substantially their centers to provide flanges 14' and 15', which support the film spool 17. The film spool 17 is provided with a leaf spring 18 which forms a friction drive between the sleeve 11 and the film spool 17. This magazine is provided with the usual light trap 19. A small bar or arm 20 has one end riveted to the end closure 14 of the film magazine just described and extends upwardly in the camera. At its upper end it is provided with a small stud shaft 21, which forms a support for the film supply magazine 22, which I shall now describe in detail. As shown in Fig. 2 it comprises a cylindrical member 23, to the ends of which are secured end closures or caps 24 and 25 respectively. These caps are preferably glued to the cylindrical member 23 after the film 26 has been inserted in the magazine. A film spool 27 is loosely mounted in the magazine and provided with a suitable bore for receiving the stud shaft 21. The end closure 24 is provided with an opening to receive the stud shaft 21. This opening I prefer to close by means of a frangible closure 28 of paper or other similar material. Preferably the seal 28 is provided with a dot 29, or other indicia indicating the position of the opening in the end closure 24 for receiving the stud 21. The spool 27 is provided with a countersink in the end adjacent the end closure of the magazine having the opening. The purpose of this countersink is to properly position the spool 27 relative to the end of the shaft 21 when the magazine is first positioned upon this shaft. The film 26 cannot be wound or held so tightly within the magazine as to position the bore of the spool 27 exactly in registry in the end closure 24. Otherwise the friction between the roll of film and the side of the magazine would be too great. The film must therefore fit somewhat loosely in the magazine, and this means that the bore of the spool 27 will not exactly register with the opening in the end closure 24, but by providing it with the countersink, the spool will be crowded to one side or the other when the stud shaft 21 is forced through the opening in the end closure, so as to bring the bore of the spool into exact alinement with the shaft 21. The magazine may be provided with any suitable light trap such as that shown at 30.

In Figs. 4 and 5 I have illustrated a modified form of my invention, in which the end closure 24' is not provided with a central opening but merely provided with an inwardly extending projection 31 embossed from the material of the end closure. The end closure 25' is provided with a similar projection 32, and the projections 31 and 32 form supports for the film spool 27', which may, if desired, be provided with a bore 33. The projections 31 and 32 form supports for the spool 27', upon which it can rotate. For supporting this magazine in a camera I secure a pair of spring arms 34 and 35 to the supply magazine 13 by rivets 36, or in any suitable manner, the arms 34 and 35 forming a spring grip which engages the wall of the magazine between the flanges of the two end closures, as shown in Fig. 4. In this form of my invention, the projections 31 and 32 not only serve to support the film spool 27', but likewise center this spool, so that this magazine can be used with a camera structure such as that shown in Fig. 2, which includes a stud shaft 21, for by merely placing the stud shaft in one of the depressions formed by either of the projections 31 and 32 and pressing the magazine against the shaft 21, the end closure will be broken through, and the stud shaft 21 will be properly received in the bore 33. From the above description it will therefore be clear that the magazine shown in Fig. 4 may be used with cameras including either means for supporting the supply magazine upon the take-up magazine.

In Fig. 1 I have illustrated a spring clip 37 for preventing rotation of the supply magazine toward the shutter mechanism. In Fig. 5 I have illustrated a pin 37' which performs the same function.

While I have described the details of the preferred embodiments of my invention, it is to be understood that my invention is not to be limited to these details, but is capable of other adaptations and modifications within the scope of the appended claims, and especially is it to be understood that my invention is not limited to use with means connected with the take-up magazine for supporting the supply magazine. The stud shaft 21 or the spring arms 34 and 35 of Figs. 4 and 5 can be secured to other portions of the camera if desired. Furthermore, while I have preferred to make the magazine of paper, cardboard, or other similar low-priced material, it can be formed from other materials without departing from my invention.

Having thus described my invention, what I claim is:—

1. A motion picture camera comprising a film-receiving magazine, an arm supported by said magazine, a stud on the free end of said arm, a film-supply magazine mounted on said stud and having end closures, one of said end closures being provided with an opening for receiving said stud, and a film spool loosely mounted on said stud.

2. A motion picture camera comprising a film-receiving magazine, an arm supported by said film-receiving magazine, a film supply magazine, and means for detachably mounting said supply magazine on the free end of said arm.

3. A film magazine comprising a cylindrical receptacle having end closures secured thereto and provided with a slot for withdrawing the film therefrom, one of said end closures being provided with an opening, a seal for said opening, provided with means for indicating the location of said opening, and a film spool in said receptacle having a bore extending therethrough and having a countersink in the end adjacent the opening in said closure.

4. A film magazine comprising a cylindrical receptacle having end closures secured thereto and provided with a slot for withdrawing the film therefrom, one of said end closures being provided with an opening, a seal for said opening, and a film spool in said receptacle having a bore extending therethrough and having a countersink in the end adjacent the opening of said closure.

5. A film magazine comprising a receptacle having end closures, one of said end closures comprising easily perforated material, and a film spool in said receptacle, the said spool having one end provided with a counterbore.

6. A package comprising a receptacle having a slot in the side thereof, end closures, one of said end closures being provided with an opening at substantially the center thereof, means for sealing said opening, including means for indicating the location of said opening a film spool in said receptacle having a bore and a countersink in the end adjacent the closure provided with an opening, and a film wound upon said spool.

7. A package comprising a film magazine having an end closure comprising easily perforated material, a film spool located in said receptacle and having a substantially conical shaped depression in one end, means for indicating substantially the center of said end closure, and a film on said spool.

In witness whereof I hereunto subscribe my hand this 21 day of February, 1919.

HAROLD D. AYLSWORTH.

Witnesses:
ELAINE D. UMBRIGHT,
JOHN WATSON WILDER.